(12) United States Patent
Buono et al.

(10) Patent No.: US 11,334,116 B2
(45) Date of Patent: May 17, 2022

(54) SCREEN PROTECTOR COMPRISING A GLASS-BASED SUBSTRATE AND AN ADHESIVE

(71) Applicant: CORNING INCORPORATED, Corning, NY (US)

(72) Inventors: Sean Michael Buono, Horseheads, NY (US); Jacob Immerman, Corning, NY (US); Chih Yuan Lu, Kaohsiung County (TW); James Edward Morrison, Jr., Campbell, NY (US); Santona Pal, Corning, NY (US); Ananthanarayanan Subramanian, Corning, NY (US); Chu Yu Yeh, Taichung (TW)

(73) Assignee: CORNING INCORPORATED, Corning, NY (US)

( * ) Notice: Subject to any disclaimer, the term of this patent is extended or adjusted under 35 U.S.C. 154(b) by 29 days.

(21) Appl. No.: 16/538,337

(22) Filed: Aug. 12, 2019

(65) Prior Publication Data

US 2020/0057470 A1 Feb. 20, 2020

Related U.S. Application Data

(60) Provisional application No. 62/718,560, filed on Aug. 14, 2018.

(51) Int. Cl.
*G06F 1/16* (2006.01)
*B32B 7/12* (2006.01)
*H04B 1/3888* (2015.01)

(52) U.S. Cl.
CPC .............. *G06F 1/1637* (2013.01); *B32B 7/12* (2013.01); *H04B 1/3888* (2013.01); *B32B 2457/20* (2013.01); *B32B 2571/00* (2013.01)

(58) Field of Classification Search
CPC ..... G06F 1/1637; B32B 7/12; B32B 2457/20; B32B 2571/00; B32B 17/06; H04B 1/3888; H04M 1/02
See application file for complete search history.

(56) References Cited

U.S. PATENT DOCUMENTS 7,070,837 B2 7/2006 Ross
8,425,711 B2 4/2013 Higuchi et al.
(Continued)

FOREIGN PATENT DOCUMENTS

CN 103108842 A 5/2013
EP 2128105 A1 12/2009
EP 3241676 A1 11/2017

OTHER PUBLICATIONS

C1499-15 ASTM Standard; "Monotonic Equibiaxial Flexural Strength of Advanced Ceramics at Ambient Temperature"; (2019) 13 Pages.
(Continued)

*Primary Examiner* — Anthony J Frost
(74) *Attorney, Agent, or Firm* — Kevin M. Johnson

(57) ABSTRACT

A screen protector comprises a glass-based substrate and an adhesive. The glass-based substrate comprises a first major surface, a second major surface, a thickness, and an edge. The first major surface comprises a first planar portion and a peripheral portion extending outwardly from the first planar portion. The second major surface comprises a second planar portion opposite the first planar portion and is parallel to the first planar portion. The edge comprises an outer peripheral surface that intersects the peripheral portion of the first major surface. The adhesive comprises a first major surface, a second major surface, a thickness, and an edge. The first major surface of the adhesive is adhered to the second major surface of the glass-based substrate.

20 Claims, 4 Drawing Sheets

(56) References Cited

U.S. PATENT DOCUMENTS

| | | |
|---|---|---|
| 8,937,689 B2 | 1/2015 | Prest et al. |
| 9,061,542 B1 | 6/2015 | Huang |
| 9,063,699 B1 | 6/2015 | Huang |
| 9,292,128 B1 | 3/2016 | Huang |
| 9,801,297 B2 | 10/2017 | Amin et al. |
| 9,814,151 B2 | 11/2017 | Probst |
| 2007/0279853 A1 | 12/2007 | Hung et al. |
| 2009/0298668 A1* | 12/2009 | Ikenishi ................ C03C 3/247 501/44 |
| 2011/0019123 A1* | 1/2011 | Prest ..................... G02B 7/007 349/58 |
| 2012/0052302 A1 | 3/2012 | Matusick et al. |
| 2013/0069502 A1 | 3/2013 | Hu et al. |
| 2013/0271710 A1* | 10/2013 | Tatemura .......... G02F 1/133514 349/110 |
| 2014/0065401 A1 | 3/2014 | Donovan et al. |
| 2014/0083198 A1 | 3/2014 | Sharps et al. |
| 2015/0166406 A1* | 6/2015 | Ishimaru ................ C03C 15/00 428/192 |
| 2017/0094039 A1 | 3/2017 | Lu |
| 2017/0150628 A1* | 5/2017 | Amin ................ B32B 17/10091 |
| 2017/0275197 A1* | 9/2017 | Altman ................ C03B 33/091 |

OTHER PUBLICATIONS

C158 ASTM Standard; "Strength of Glass By Flexure (Determination of Modulus of Rupture)"; (2017); 9 Pages.

Egboiyi et al; "Methods and Apparatus for Determining a Crush Strength of an Edge"; U.S. Appl. No. 16/537,004, filed Aug. 9, 2019; 29 Pages.

Gulati "Edge Strength Testing of Thin Glasses" Intl. J. App. Glass Sci 2 (2011): 39-46.

Pantelides "Edge Strength of Window Glass By Mechanical Test"; J. Eng. Mech. 120 (1994): 1076-1090.

International Search Report and Written Opinion of the European International Searching Authority; PCT/US2019/046110; dated Nov. 21, 2019; 12 Pgs.

* cited by examiner

SCREEN PROTECTOR COMPRISING A GLASS-BASED SUBSTRATE AND AN ADHESIVE

CROSS-REFERENCE TO RELATED APPLICATIONS

This application claims the benefit of priority under 35 U.S.C. § 119 of U.S. Provisional Application Ser. No. 62/718,560 filed on Aug. 14, 2018 the content of which is relied upon and incorporated herein by reference in its entirety.

FIELD

The present disclosure relates generally to a screen protector comprising a glass-based substrate and an adhesive and, more particularly, to a screen protector comprising a glass-based substrate further comprising a second major surface with a second planar portion adhered to an adhesive and first major surface with a first planar portion and a peripheral portion.

BACKGROUND

Electronic devices often comprise displays with cover glass integral to the device itself. Damage to the cover glass can be costly to repair or replace. As such, there is a desire to protect electronic devices, especially the cover glass of the device's display, from damage.

It is known to protect electronic devices from damage by placing the electronic device in a protective housing. However, protective housings with desired mechanic properties are not transparent, which impairs use of the underlying electronic device. It is also known to protect electronic devices from damage by placing a sheet of transparent material (e.g., a screen protector) over the electronic device. However, such transparent material usually does not comprise the desired mechanical properties. Even transparent materials with desirable mechanical properties for the bulk of the material do not maintain such properties at the edge of the material.

Localized stresses can be applied to the edge of a material through contact with rough surfaces (e.g., concrete), corners, and small objects (e.g., keys, paper clips). Once any part of the material has failed, the corresponding sheet of material is usually discarded and replaced. As mentioned, the edge of the material tends to comprise weaker mechanical properties than those of the bulk.

Consequently, there is a need for material designs that comprise mechanical properties at an edge that are comparable to the mechanical properties of the bulk. There is a further need for such material designs that comprise the desired mechanical properties to protect an electronic device. Still further, there is a need for such material designs to be transparent.

SUMMARY

There are set forth screen protectors that are transparent and more efficiently protect an underlying electronic device because the screen protectors comprise desirable mechanical properties at an edge. Such mechanical properties comprise an edge strength as measured using a four-point bend test and a crush strength using a test method aimed at simulating failure under actual use conditions. Features of the disclosure achieve the above mechanical properties for a screen protector comprising a glass-based substrate less than 1 mm thick and an adhesive.

Some example embodiments of the disclosure are described below with the understanding that any of the embodiments may be used alone or in combination with one another.

Embodiment 1

A screen protector may comprise a glass-based substrate and an adhesive. The glass-based substrate may comprise a first major surface, a second major surface, an edge extending between the first major surface and the second major surface. The first major surface can comprise a first planar portion and a peripheral portion extending outwardly from the first planar portion. The second major surface can comprise a second planar portion opposite the first planar portion. The second planar portion may be parallel relative to the first planar portion. The edge can comprise an outer peripheral surface intersecting the peripheral portion of the first major surface. The edge may further comprise an undercut surface intersecting the outer peripheral surface of the edge and the second planar portion of the second major surface. The glass-based substrate may further comprise a thickness defined between the first planar portion and the second planar portion along a thickness direction perpendicular to the first planar portion. The thickness of the glass-based substrate can be within a range of from about 100 micrometers to about 1,000 micrometers. The adhesive may comprise a first major surface, a second major surface, and an edge extending between the first major surface of the adhesive and the second major surface of the adhesive. The first major surface of the adhesive can be adhered to the second planar portion of the second major surface of the glass-based substrate. The adhesive can further comprise a thickness defined between the first major surface of the adhesive and the second major surface of the adhesive. The thickness of the adhesive can be within a range of from about 50 micrometers to about 200 micrometers. The screen protector may also comprise a maximum distance between the outer peripheral surface of the edge of the glass-based substrate and the edge of the adhesive in a direction perpendicular to the thickness direction of the glass-based substrate can be within a range of from about 100 nanometers to about 100 micrometers.

Embodiment 2

The screen protector of embodiment 1, where the peripheral portion of the first major surface of the glass-based substrate may extend in a direction toward a plane of the second planar portion.

Embodiment 3

The screen protector of any one of embodiments 1 and 2, where the peripheral portion of the first major surface of the glass-based substrate may comprise a curved surface.

Embodiment 4

The screen protector of any one of embodiments 1-3, where the peripheral surface of the edge can comprise a height in the thickness direction within a range of from about 60% to about 99% of the thickness of the glass-based substrate.

Embodiment 5

The screen protector of any one of embodiments 1-4, where the outer peripheral surface of the edge may comprise a flat surface.

Embodiment 6

The screen protector of any one of embodiments 1-4, where the outer peripheral surface of the edge may comprise a curved surface.

Embodiment 7

The screen protector of any one of embodiments 1-6, where the undercut surface may comprise a flat surface.

Embodiment 8

The screen protector of any one of embodiments 1-6, where the undercut surface may comprise a curved surface.

Embodiment 9

The screen protector of any one of embodiments 1-8, where the undercut surface may comprise a height in the thickness direction within a range of from about 100 nanometers to about 50 micrometers.

Embodiment 10

The screen protector of any one of embodiments 1-9, where the thickness of the glass-based substrate can be within a range of from about 100 micrometers to about 400 micrometers.

Embodiment 11

The screen protector of any one of embodiments 1-10, where the thickness of the adhesive can be within a range of from about 100 micrometers to about 180 micrometers.

Embodiment 12

The screen protector of any one of embodiments 1-11, where the maximum distance between the outer peripheral surface of the edge of the glass-based substrate and the edge of the adhesive in a direction perpendicular to the thickness direction of the glass-based substrate can be within a range of from about 100 nanometers to about 80 micrometers.

Embodiment 13

The screen protector of any one of embodiments 1-12, where the maximum distance between the outer peripheral surface of the edge of the glass-based substrate and the edge of the adhesive in a direction perpendicular to the thickness direction of the glass-based substrate is within a range of from about 1 micrometer to about 50 micrometers.

Embodiment 14

The screen protector of embodiments 1-13, where the screen protector may comprise a 10% probability of failure for a four-point bend test (B10 edge strength) within a range of from about 250 MegaPascals (MPa) to about 1,000 MPa.

Embodiment 15

The screen protector of any one of embodiments 1-14, where the glass-based substrate may comprise a strengthened glass-based substrate selected from a group consisting of a chemically strengthened glass-based substrate, a thermally strengthened glass-based substrate, and a chemically and thermally strengthened glass-based substrate.

Embodiment 16

The screen protector of embodiment 15, where the strengthened glass-based substrate may comprise a central tension within a range from about 10 MegaPascals (MPa) to about 100 MPa.

Embodiment 17

The screen protector of any one of embodiments 1-16, where the undercut surface of the edge of the glass-based substrate can comprise a surface roughness (Ra) within a range from about 1 nanometer to about 50 nanometers.

Embodiment 18

An apparatus comprising the screen protector of any one of embodiments 1-17 and an electronic device. The electronic device may comprise a mounting surface. The glass-based sheet of the screen protector can be mounted on the mounting surface of the electronic device with the adhesive of the screen protector. The apparatus can comprise an average failure for an edge crush test (average crush strength) on the glass-based substrate for a load within a range from about 50 Newtons (N) to about 500 N.

Embodiment 19

A screen protector may comprise a glass-based substrate and an adhesive. The glass-based substrate may comprise a first major surface, a second major surface, an edge extending between the first major surface and the second major surface. The first major surface can comprise a first planar portion and a peripheral portion extending outwardly from the first planar portion. The second major surface can comprise a second planar portion opposite the first planar portion. The second planar portion may be parallel relative to the first planar portion. The edge can comprise an outer peripheral surface intersecting the peripheral portion of the first major surface. The edge may further comprise an undercut surface intersecting the outer peripheral surface of the edge and the second planar portion of the second major surface. The glass-based substrate may further comprise a thickness defined between the first planar portion and the second planar portion along a thickness direction perpendicular to the first planar portion. The thickness of the glass-based substrate can be within a range of from about 100 micrometers to about 1,000 micrometers. The adhesive may comprise a first major surface, a second major surface, and an edge extending between the first major surface of the adhesive and the second major surface of the adhesive. The first major surface of the adhesive can be adhered to the second planar portion of the second major surface of the glass-based substrate. The adhesive can further comprise a thickness defined between the first major surface of the adhesive and the second major surface of the adhesive. The screen protector may also comprise a maximum distance between the outer peripheral surface of the edge of the glass-based substrate and the edge of the adhesive in a direction perpendicular to the thickness direction of the glass-based substrate. The screen protector can comprise a 10% probability of failure for a four-point bend test (B10 edge strength) within a range of from about 250 MegaPascals (MPa) to about 1,000 MPa.

Embodiment 20

The screen protector of embodiment 19, where the peripheral portion of the first major surface of the glass-based substrate may extend in a direction toward a plane of the second planar portion.

Embodiment 21

The screen protector of any one of embodiments 19 and 20, where the peripheral portion of the first major surface of the glass-based substrate may comprise a curved surface.

Embodiment 22

The screen protector of any one of embodiments 19-21, where the peripheral surface of the edge can comprise a height in the thickness direction within a range of from about 60% to about 99% of the thickness of the glass-based substrate.

Embodiment 23

The screen protector of any one of embodiments 19-22, where the outer peripheral surface of the edge may comprise a flat surface.

Embodiment 24

The screen protector of any one of embodiments 19-22, where the outer peripheral surface of the edge may comprise a curved surface.

Embodiment 25

The screen protector of any one of embodiments 19-24, where the undercut surface may comprise a flat surface.

Embodiment 26

The screen protector of any one of embodiments 19-24, where the undercut surface may comprise a curved surface.

Embodiment 27

The screen protector of any one of embodiments 19-26, where the undercut surface may comprise a height in the thickness direction within a range of from about 100 nanometers to about 50 micrometers.

Embodiment 28

The screen protector of any one of embodiments 19-27, where the thickness of the glass-based substrate can be within a range of from about 100 micrometers to about 400 micrometers.

Embodiment 29

The screen protector of any one of embodiments 19-28, where the maximum distance between the outer peripheral surface of the edge of the glass-based substrate and the edge of the adhesive in a direction perpendicular to the thickness direction of the glass-based substrate can be within a range of from about 100 nanometers to about 80 micrometers.

Embodiment 30

The screen protector of any one of embodiments 19-29, where the maximum distance between the outer peripheral surface of the edge of the glass-based substrate and the edge of the adhesive in a direction perpendicular to the thickness direction of the glass-based substrate is within a range of from about 1 micrometer to about 50 micrometers.

Embodiment 31

The screen protector of any one of embodiments 19-30, where the glass-based substrate may comprise a strengthened glass-based substrate selected from a group consisting of a chemically strengthened glass-based substrate, a thermally strengthened glass-based substrate, and a chemically and thermally strengthened glass-based substrate.

Embodiment 32

The screen protector of embodiment 31, where the strengthened glass-based substrate may comprise a central tension within a range from about 10 MegaPascals (MPa) to about 100 MPa.

Embodiment 33

The screen protector of any one of embodiments 19-32, where the undercut surface of the edge of the glass-based substrate can comprise a surface roughness (Ra) within a range from about 1 nanometer to about 50 nanometers.

Embodiment 34

An apparatus comprising the screen protector of any one of embodiments 19-33 and an electronic device. The electronic device may comprise a mounting surface. The glass-based sheet of the screen protector can be mounted on the mounting surface of the electronic device with the adhesive of the screen protector. The apparatus can comprise an average failure for an edge crush test (average crush strength) on the glass-based substrate for a load within a range from about 50 Newtons (N) to about 500 N.

Embodiment 35

An apparatus may comprise a glass-based substrate, an adhesive, and an electronic device. The glass-based substrate may comprise a first major surface, a second major surface, an edge extending between the first major surface and the second major surface. The first major surface can comprise a first planar portion and a peripheral portion extending outwardly from the first planar portion. The second major surface can comprise a second planar portion opposite the first planar portion. The second planar portion may be parallel relative to the first planar portion. The edge can comprise an outer peripheral surface intersecting the peripheral portion of the first major surface. The glass-based substrate may further comprise a thickness defined between the first planar portion and the second planar portion along a thickness direction perpendicular to the first planar portion. The thickness of the glass-based substrate can be within a range of from about 100 micrometers to about 1,000 micrometers. The adhesive may comprise a first major surface, a second major surface, and an edge extending between the first major surface of the adhesive and the second major surface of the adhesive. The first major surface of the adhesive can be adhered to the second planar portion of the second major surface of the glass-based substrate. The adhesive can further comprise a thickness defined between the first major surface of the adhesive and the second major surface of the adhesive. The thickness of the adhesive can be within a range of from about 50 micrometers to about 200 micrometers. The screen protector may also comprise a maximum distance between the outer peripheral surface of the edge of the glass-based substrate and the edge of the adhesive in a direction perpendicular to the thickness direction of the glass-based substrate can be within a range of from about 100 nanometers to about 100 micrometers. The electronic device can comprise a mounting surface. The glass-based substrate can be mounted to the mounting surface of the electronic device with the adhesive. The apparatus may comprise an average failure for an edge crush test (average crush strength) on the glass-based substrate for a load within a range of from about 50 Newtons (N) to about 500 N.

Embodiment 36

The apparatus of embodiment 35, where the peripheral portion of the first major surface of the glass-based substrate may extend in a direction toward a plane of the second planar portion.

Embodiment 37

The apparatus of any one of embodiments 35 and 36, where the peripheral portion of the first major surface of the glass-based substrate may comprise a curved surface.

Embodiment 38

The apparatus of any one of embodiments 35-37, where the peripheral surface of the edge can comprise a height in the thickness direction within a range of from about 60% to about 99% of the thickness of the glass-based substrate.

Embodiment 39

The apparatus of any one of embodiments 35-38, where the outer peripheral surface of the edge may comprise a flat surface.

Embodiment 40

The apparatus of any one of embodiments 35-38, where the outer peripheral surface of the edge may comprise a curved surface.

Embodiment 41

The apparatus of any one of embodiments 35-40, where the thickness of the glass-based substrate can be within a range of from about 100 micrometers to about 400 micrometers.

Embodiment 42

The apparatus of any one of embodiments 35-41, where the thickness of the adhesive can be within a range of from about 100 micrometers to about 180 micrometers.

Embodiment 43

The apparatus of any one of embodiments 35-42, where the maximum distance between the outer peripheral surface of the edge of the glass-based substrate and the edge of the adhesive in a direction perpendicular to the thickness direction of the glass-based substrate can be within a range of from about 100 nanometers to about 80 micrometers.

Embodiment 44

The apparatus of any one of embodiments 35-43, where the maximum distance between the outer peripheral surface of the edge of the glass-based substrate and the edge of the adhesive in a direction perpendicular to the thickness direction of the glass-based substrate is within a range of from about 1 micrometer to about 50 micrometers.

Embodiment 45

The apparatus of embodiments 35-44, where the glass-based substrate and the adhesive may comprise a 10% probability of failure for a four-point bend test (B10 edge strength) within a range of from about 250 MegaPascals (MPa) to about 1,000 MPa.

Embodiment 46

The apparatus of any one of embodiments 35-45, where the glass-based substrate may comprise a strengthened glass-based substrate selected from a group consisting of a chemically strengthened glass-based substrate, a thermally strengthened glass-based substrate, and a chemically and thermally strengthened glass-based substrate.

Embodiment 47

The apparatus of embodiment 46, where the strengthened glass-based substrate may comprise a central tension within a range from about 10 MegaPascals (MPa) to about 100 MPa.

Embodiment 48

A screen protector may comprise a glass-based substrate and an adhesive. The glass-based substrate may comprise a first major surface, a second major surface, an edge extending between the first major surface and the second major surface. The first major surface can comprise a first planar portion and a peripheral portion extending outwardly from the first planar portion. The second major surface can comprise a second planar portion opposite the first planar portion. The second planar portion may be parallel relative to the first planar portion. The edge can comprise an outer peripheral surface intersecting the peripheral portion of the first major surface. The edge may further comprise an undercut surface intersecting the outer peripheral surface of the edge and the second planar portion of the second major surface. The undercut may comprise a surface roughness (Ra) within a range of from about 1 nanometer to about 50 nanometers. The glass-based substrate may further comprise a thickness defined between the first planar portion and the second planar portion along a thickness direction perpendicular to the first planar portion. The thickness of the glass-based substrate can be within a range of from about 100 micrometers to about 1,000 micrometers. The adhesive may comprise a first major surface, a second major surface, and an edge extending between the first major surface of the adhesive and the second major surface of the adhesive. The first major surface of the adhesive can be adhered to the second planar portion of the second major surface of the glass-based substrate. The adhesive can further comprise a thickness defined between the first major surface of the adhesive and the second major surface of the adhesive. The screen protector may also comprise a maximum distance between the outer peripheral surface of the edge of the glass-based substrate and the edge of the adhesive in a direction perpendicular to the thickness direction of the glass-based substrate. The glass-based substrate can be chemical strengthened and comprise a central tension within a range from about 10 MegaPascals (MPa) to about 100 MPa. The screen protector may comprise a 10% probability of failure for a four-point bend test (B10 edge strength) within a range of from about 250 MPa to about 1,000 MPa.

Embodiment 49

The screen protector of embodiment 48, where the peripheral portion of the first major surface of the glass-based substrate may extend in a direction toward a plane of the second planar portion.

Embodiment 50

The screen protector of any one of embodiments 48 and 49, where the peripheral portion of the first major surface of the glass-based substrate may comprise a curved surface.

Embodiment 51

The screen protector of any one of embodiments 48-50, where the peripheral surface of the edge can comprise a height in the thickness direction within a range of from about 60% to about 99% of the thickness of the glass-based substrate.

Embodiment 52

The screen protector of any one of embodiments 48-51, where the outer peripheral surface of the edge may comprise a flat surface.

Embodiment 53

The screen protector of any one of embodiments 48-51, where the outer peripheral surface of the edge may comprise a curved surface.

Embodiment 54

The screen protector of any one of embodiments 48-53, where the undercut surface may comprise a flat surface.

Embodiment 55

The screen protector of any one of embodiments 48-53, where the undercut surface may comprise a curved surface.

Embodiment 56

The screen protector of any one of embodiments 48-55, where the undercut surface may comprise a height in the thickness direction within a range of from about 100 nanometers to about 50 micrometers.

Embodiment 57

The screen protector of any one of embodiments 48-56, where the thickness of the glass-based substrate can be within a range of from about 100 micrometers to about 400 micrometers.

Embodiment 58

The screen protector of any one of embodiments 48-57, where the maximum distance between the outer peripheral surface of the edge of the glass-based substrate and the edge of the adhesive in a direction perpendicular to the thickness direction of the glass-based substrate can be within a range of from about 100 nanometers to about 80 micrometers.

Embodiment 59

The screen protector of any one of embodiments 48-58, where the maximum distance between the outer peripheral surface of the edge of the glass-based substrate and the edge of the adhesive in a direction perpendicular to the thickness direction of the glass-based substrate is within a range of from about 1 micrometer to about 50 micrometers.

Embodiment 60

The screen protector of any one of embodiments 48-59, where the undercut surface of the edge of the glass-based substrate can comprise a surface roughness (Ra) within a range from about 1 nanometer to about 50 nanometers.

Embodiment 61

An apparatus comprising the screen protector of any one of embodiments 48-60 and an electronic device. The electronic device may comprise a mounting surface. The glass-based sheet of the screen protector can be mounted on the mounting surface of the electronic device with the adhesive of the screen protector. The apparatus can comprise an average failure for an edge crush test (average crush strength) on the glass-based substrate for a load within a range from about 50 Newtons (N) to about 500 N.

Embodiment 62

A screen protector may comprise a glass-based substrate and an adhesive. The glass-based substrate may comprise a first major surface, a second major surface, an edge extending between the first major surface and the second major surface. The first major surface can comprise a first planar portion and a peripheral portion extending outwardly from the first planar portion. The second major surface can comprise a second planar portion opposite the first planar portion. The second planar portion may be parallel relative to the first planar portion. The edge can comprise an outer peripheral surface intersecting the peripheral portion of the first major surface. The edge may further comprise an undercut surface intersecting the outer peripheral surface of the edge and the second planar portion of the second major surface. The outer peripheral surface of the edge may comprise a height in the thickness direction that can be within a range of from about 60% to about 99% of the thickness of the glass-based substrate. The undercut may comprise a surface roughness (Ra) within a range of from about 1 nanometer to about 50 nanometers. The glass-based substrate may further comprise a thickness defined between the first planar portion and the second planar portion along a thickness direction perpendicular to the first planar portion. The thickness of the glass-based substrate can be within a range of from about 100 micrometers to about 1,000 micrometers. The adhesive may comprise a first major surface, a second major surface, and an edge extending between the first major surface of the adhesive and the second major surface of the adhesive. The first major surface of the adhesive can be adhered to the second planar portion of the second major surface of the glass-based substrate. The adhesive can further comprise a thickness defined between the first major surface of the adhesive and the second major surface of the adhesive. The thickness of the adhesive can be within a range of from about 50 micrometers to about 200 micrometers. The screen protector may also comprise a maximum distance between the outer peripheral surface of the edge of the glass-based substrate and the edge of the adhesive in a direction perpendicular to the thickness direction of the glass-based substrate can be within a range of from about 100 nanometers to about 100 micrometers. The screen protector may comprise an average failure for an edge crush test (average crush strength) for a load within a range of from about 50 Newtons (N) to about 500 N.

Embodiment 63

The apparatus of embodiment 62, where the peripheral portion of the first major surface of the glass-based substrate may extend in a direction toward a plane of the second planar portion.

Embodiment 64

The apparatus of any one of embodiments 62 and 63, where the peripheral portion of the first major surface of the glass-based substrate may comprise a curved surface.

Embodiment 65

The apparatus of any one of embodiments 62-64, where the outer peripheral surface of the edge may comprise a flat surface.

Embodiment 66

The apparatus of any one of embodiments 62-64, where the outer peripheral surface of the edge may comprise a curved surface.

Embodiment 67

The apparatus of any one of embodiments 62-66, where the undercut surface may comprise a flat surface.

Embodiment 68

The apparatus of any one of embodiments 62-66, where the undercut surface may comprise a curved surface.

Embodiment 69

The apparatus of any one of embodiments 62-68, where the undercut surface can comprise a height in the thickness direction that is within a range from about 100 nanometers to about 50 micrometers.

Embodiment 70

The apparatus of any one of embodiments 62-69, where the thickness of the glass-based substrate can be within a range from about 100 micrometers to about 400 micrometers.

Embodiment 71

The apparatus of any one of embodiments 62-70, where the thickness of the adhesive can be within a range of from about 100 micrometers to about 180 micrometers.

Embodiment 72

The apparatus of any one of embodiments 62-71, where the maximum distance between the outer peripheral surface of the edge of the glass-based substrate and the edge of the adhesive in a direction perpendicular to the thickness direction of the glass-based substrate can be within a range of from about 100 nanometers to about 80 micrometers.

Embodiment 73

The apparatus of any one of embodiments 62-72, where the maximum distance between the outer peripheral surface of the edge of the glass-based substrate and the edge of the adhesive in a direction perpendicular to the thickness direction of the glass-based substrate is within a range of from about 1 micrometer to about 50 micrometers.

Embodiment 74

The apparatus of embodiments 62-73, where the glass-based substrate and the adhesive may comprise a 10% probability of failure for a four-point bend test (B10 edge strength) within a range of from about 250 MegaPascals (MPa) to about 1,000 MPa.

Embodiment 75

The apparatus of any one of embodiments 62-74, where the glass-based substrate may comprise a strengthened glass-based substrate selected from a group consisting of a chemically strengthened glass-based substrate, a thermally strengthened glass-based substrate, and a chemically and thermally strengthened glass-based substrate.

Embodiment 76

The apparatus of embodiment 75, where the strengthened glass-based substrate may comprise a central tension within a range from about 10 MegaPascals (MPa) to about 100 MPa.

Embodiment 77

A portable electronic device can comprise the screen protector of any one of embodiments 1-17, 19-33, and 48-60, a display, and a screen extending over the display further comprising an outer major surface. The second major surface of the adhesive can be adhered to the outer major surface of the screen of the portable electronic device.

Embodiment 78

The portable electronic device of embodiment 77, where the screen of the portable electronic device comprises a glass-based cover substrate.

BRIEF DESCRIPTION OF THE DRAWINGS

The above and other features and advantages of embodiments of the present disclosure are better understood when the following detailed description is read with reference to the accompanying drawings, in which.

DETAILED DESCRIPTION

Figure 1:
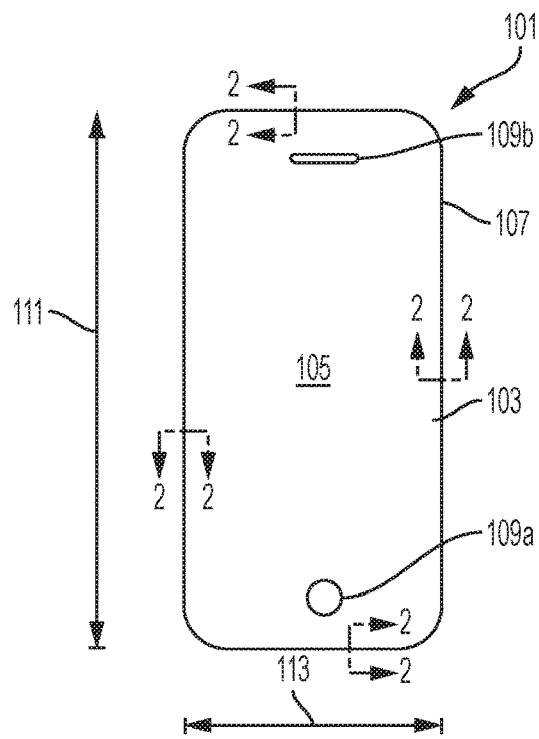
FIG. 1 is a schematic view of a screen protector in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, claims may encompass many different embodiments of various embodiments and should not be construed as limited to the embodiments set forth herein.

Figure 2:
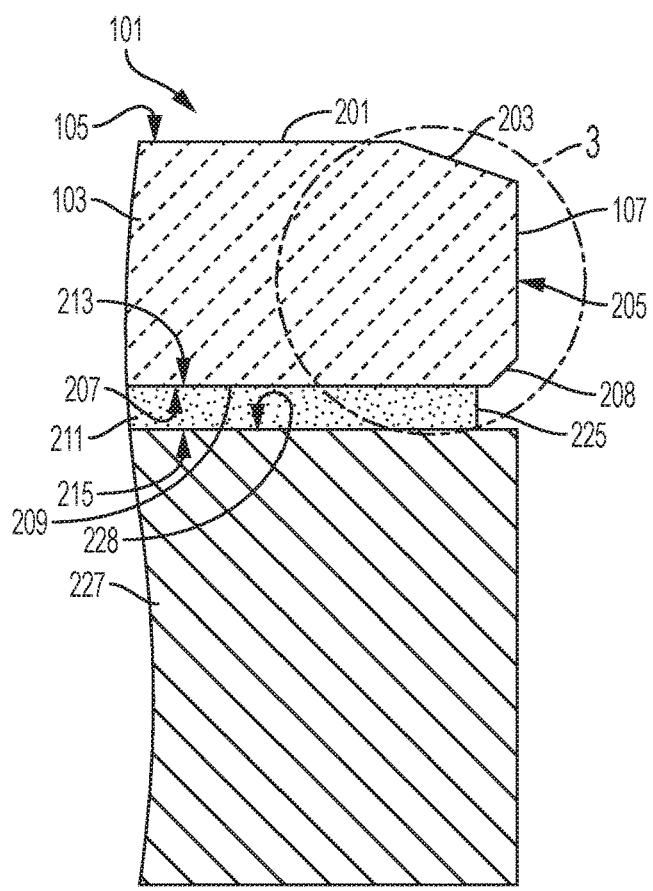
FIG. 2 is a cross-sectional view of some embodiments of the apparatus along lines 2-2 of FIG. 1.

FIG. 1 illustrates a schematic view of a screen protector 101 in accordance with the embodiments of the disclosure. In some embodiments, the screen protector 101 may comprise a glass-based substrate 103. In some embodiments, as shown in FIG. 1, the screen protector 101 may comprise holes 109a, 109b in the glass-based substrate 103. In some embodiments, at least one hole may correspond to the location of a speaker, a microphone, a button, a switch, or a camera on a device 227 (see FIG. 2) that the screen protector 101 has been designed to protect.

The screen protector 101 may comprise a length 111 and a width 113, as shown in FIG. 1. In some embodiments, the length 111 of the screen protector 101 can be about 1 millimeter (mm) or more, about 30 mm or more, about 50 mm or more, about 100 mm or more, about 130 mm or more, about 150 mm or more, about 160 mm or more, about 200 mm or more, about 500 mm or less, about 300 mm or less, or about 200 mm or less. In some embodiments, the length 111 of the screen protector 101 can be within a range from about 1 mm to about 500 mm, from about 1 mm to about 300 mm, from about 1 mm to about 200 mm, from about 1 mm to about 200 mm, from about 30 mm to about 500 mm, from about 30 mm to about 300 mm, from about 30 mm to about 200 mm, from about 50 mm to about 500 mm, from about 50 mm to about 300 mm, from about 50 mm to about 200 mm, from about 100 mm to about 500 mm, from about 100 mm to about 300 mm, from about 100 mm to about 200 mm, from about 120 mm to about 200 mm, from about 130 mm to about 200 mm, from about 50 mm to about 160 mm, from about 50 mm to about 150 mm, and all ranges and subranges therebetween. In some embodiments, the width 113 of the screen protector 101 can be about the same, greater than, or less than the length 111 of the screen protector 101. In some embodiments, the width 113 of the screen protector 101 can comprise the ranges presented above for the length 111 of the screen protector. In some embodiments, the length 111 and width 113 of the screen protector 101 can be the same as the corresponding dimensions of a device 227 (see FIG. 2) or portion of the device 227 (e.g., screen of the device) that the screen protector 101 has been designed to protect. In some embodiments, the length 111 and width 113 of the screen protector 101 can be proportional to the corresponding dimensions of the device 227 (see FIG. 2) or portion of the device 227 (e.g., screen of the device) that the screen protector 101 has been designed to protect. In some embodiments, the length 111 and/or width 113 of the screen protector 101 can be less than or greater than the corresponding dimensions of the device 227 or portion of the device 227 (e.g., screen of the device) that the screen protector 101 has been designed to protect.

As mentioned above, the screen protector may comprise a glass-based substrate 103. As used herein, "glass-based" includes both glasses and glass-ceramics, wherein glass-ceramics have one or more crystalline phases and an amorphous, residual glass phase. The glass-based substrate 103 may comprise an amorphous material (e.g., glass) and optionally one or more crystalline materials (e.g., ceramic). Amorphous materials and glass-based materials comprising the glass-based substrate 103 may be thermally or chemically strengthened, as described below. Exemplary glass-based materials, which may be free of lithia or not, comprise soda lime glass, alkali aluminosilicate glass, alkali containing borosilicate glass, alkali alumniophosphosilicate glass, and alkali aluminoborosilicate glass. In one or more embodiments, a glass-based substrate 103 may comprise, in mole percent (mol %): $SiO_2$ in a range from about 40 mol % to about 80%, $Al_2O_3$ in a range from about 10 mol % to about 30 mol %, $B_2O_3$ in a range from about 0 mol % to about 10 mol %, $ZrO_2$ in a range from about 0 mol % to about 5 mol %, $P_2O_5$ in a range from about 0 mol % to about 15 mol %, $TiO_2$ in a range from about 0 mol % to about 2 mol %, $R_2O$ in a range from about 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate 103 may optionally further comprise in a range from about 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. In some embodiments, the glass-based substrate 103 may be transparent, meaning that the glass-based substrate 103 comprises an average light transmission over the optical wavelengths from 400 nanometers (nm) to 700 nm of about 85% or greater, about 86% or greater, about 87% or greater, about 88% or greater, about 89% or greater, about 90% or greater, about 91% or greater, or about 92% or greater.

In some embodiments, as shown in FIGS. 2-6, the glass-based substrate 103 can comprises a first major surface 105, 403, 503, 603 comprising a first planar portion 201, 409, 509, 609 and a second major surface 207, 405, 505, 605 that may be opposite the corresponding first major surface 105, 403, 503, 603. The second major surface 207, 405, 505, 605 can comprise a second planar portion 209, 417, 517, 617 that may be parallel to the first planar portion 201, 409, 509, 609. In some embodiments, the first major surface 105, 403, 503, 603 of the glass-based substrate 103 may comprise one or more surface coatings. In some embodiments, the surface coating may comprise an easy-to-clean coating, a low-friction coating, an oleophobic coating, a diamond-like coating, a scratch-resistant coating, an abrasion-resistant coating, or a combination thereof. The materials making up the coatings can comprise hard oxide, nitride, or oxynitride layers, optionally in combination with metallic layers. For example, the scratch-resistant coating may comprise an oxynitride, for instance, aluminum oxynitride or silicon oxynitride. In some embodiments, the abrasion-resistant layer may comprise the same material as the scratch-resistant layer. In some embodiments, the physical thickness of the scratch-resistant coating may be in the range from about 1 nm to 10 µm, from about 25 nm to about 10 µm, from about 200 nm to about 10 µm, from about 500 nm to about 10 µm, from about 1 µm to about 10 µm, from about 100 nm to about 5 µm, from about 500 nm to about 5 µm, from about 1 µm to about 5 µm, from about 1 µm to about 2 µm, and all ranges and subranges therebetween. In some embodiments, a low-friction coating may comprise a highly fluorinated silane coupling agent, for instance, an alkyl fluorosilane with oxymethyl groups pendant on the silicon atom. In some embodiments, an easy-to-clean coating may comprise the same material as the low-friction coating. In other embodiments, the easy-to-clean coating may comprise a protonatable group, for example, an amine, for instance, an akyl aminosilane with oxymethyl groups pendant on the silicon atom. In some embodiments, the oleophobic coating may comprise the same material as the easy-to-clean coating. In some embodiments, a diamond-like coating comprises carbon and may be created by applying a high voltage potential in the presence of a hydrocarbon plasma.

Throughout the disclosure, as shown in FIGS. 3-6, a thickness 217 of the glass-based substrate 103 can be defined as the distance between a first point on the first planar portion 201, 409, 509, 609 of the first major surface 105, 403, 503, 603 of the glass-based substrate 103 and a second point on the second planar portion 209, 417, 517, 617 of the second major surface 207, 405, 505, 605 in a thickness direction 217a of the thickness 217, where the first point and the second point are chosen such that they are as close as possible. Without wishing to be bound by theory, a segment running between two parallel planes will comprise a minimum distance when it is perpendicular to both planes. In some embodiments, the thickness 217 can be about 100 micrometers (microns, µm) or more, about 200 µm or more, about 250 µm or more, about 300 µm or more, about 1,000 µm or less, about 800 µm or less, about 600 µm or less, about 550 µm or less, about 500 µm or less, about 450 µm or less, about 400 µm or less, or about 350 µm or less. In some embodiments, the thickness 217 can be within a range from about 100 µm to about 1,000 µm, from about 200 µm to about 1,000 µm, from about 250 µm to about 1,000 µm, from about 300 µm to about 1,000 µm, from about 100 µm to about 800 µm, from about 200 µm to about 800 µm, from about 250 µm to about 800 µm, from about 300 µm to about 800 µm, from about 100 µm to about 600 µm, from about 200 µm to about 600 µm, from about 250 µm to about 600 µm, from about 300 µm to about 600 µm, from about 100 µm to about 550 µm, from about 200 µm to about 550 µm, from about 250 µm to about 550 µm, from about 300 µm to about 550 µm, from about 100 µm to about 500 µm, from about 200 µm to about 500 µm, from about 250 µm to about 500 µm, from about 300 µm to about 500 µm, from about 100 µm to about 450 µm, from about 200 µm to about 450 µm, from about 200 µm to about 450 µm, from about 250 µm to about 450 µm, from about 300 µm to about 450 µm, from about 100 µm to about 400 µm, from about 200 µm to about 400 µm, from about 250 µm to about 400 µm, from about 300 µm to about 400 µm, from about 100 µm to about 350 µm, from about 200 µm to about 350 µm, from about 250 µm to about 350 µm, from about 300 µm to about 350 µm, and all ranges and subranges therebetween.

Figure 3:
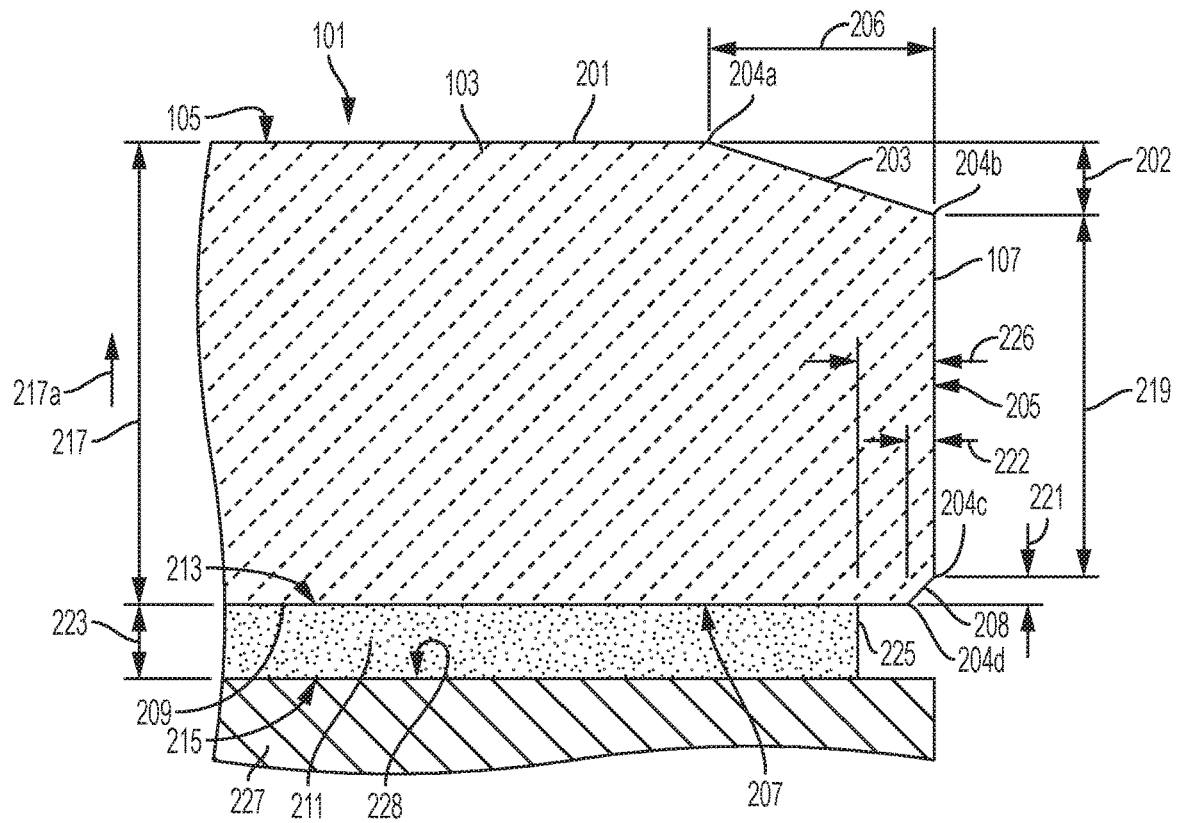
FIG. 3 is an enlarged view taken at view 3 of FIG. 2.
Figure 4:
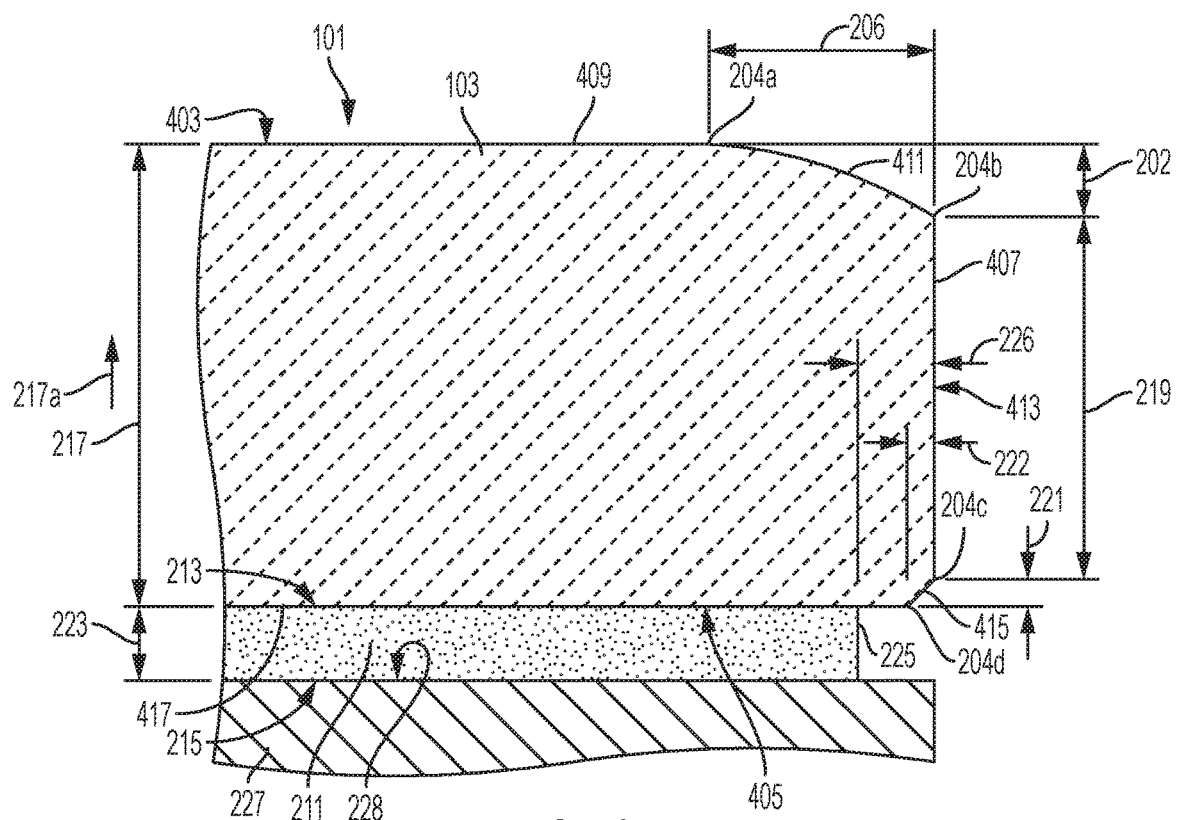
FIG. 4 is an enlarged view of some embodiments of the apparatus taken at view 3 of FIG. 2.
Figure 5:
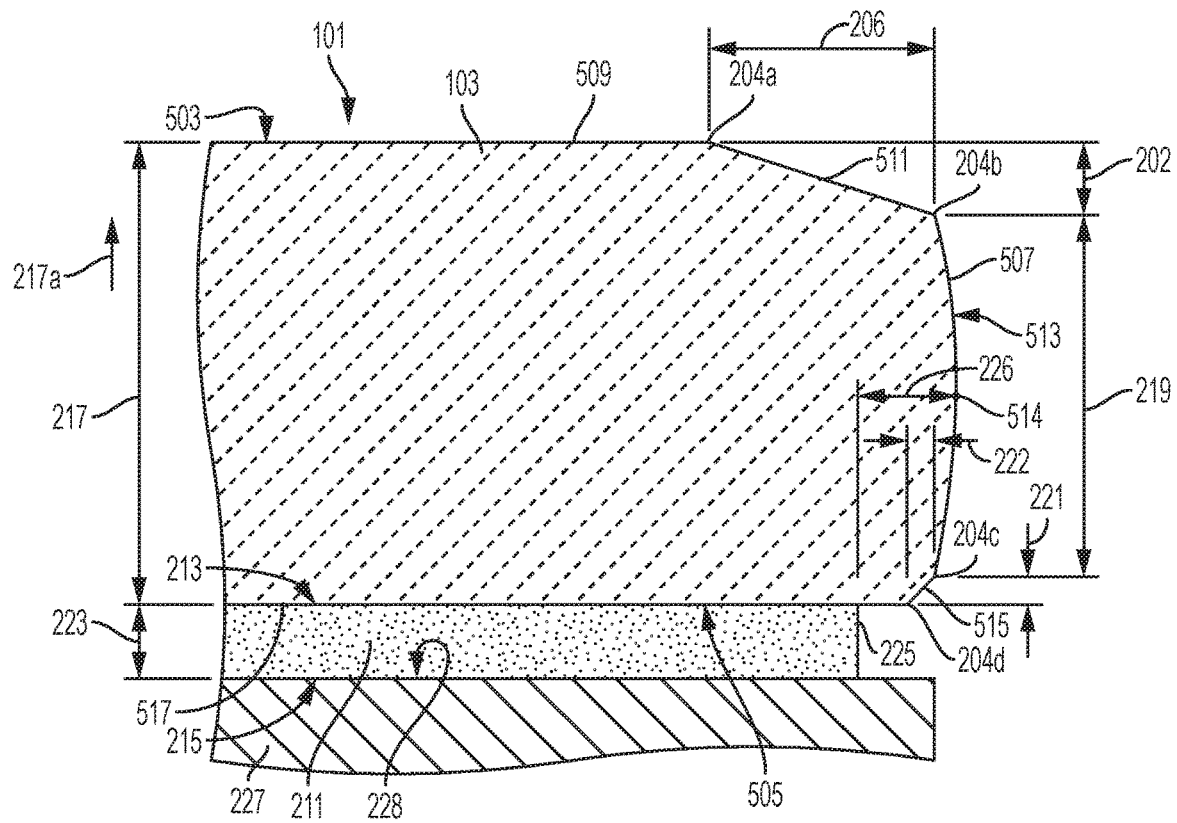
FIG. 5 is an enlarged view of some embodiments of the apparatus taken at view 3 of FIG. 2.
Figure 6:
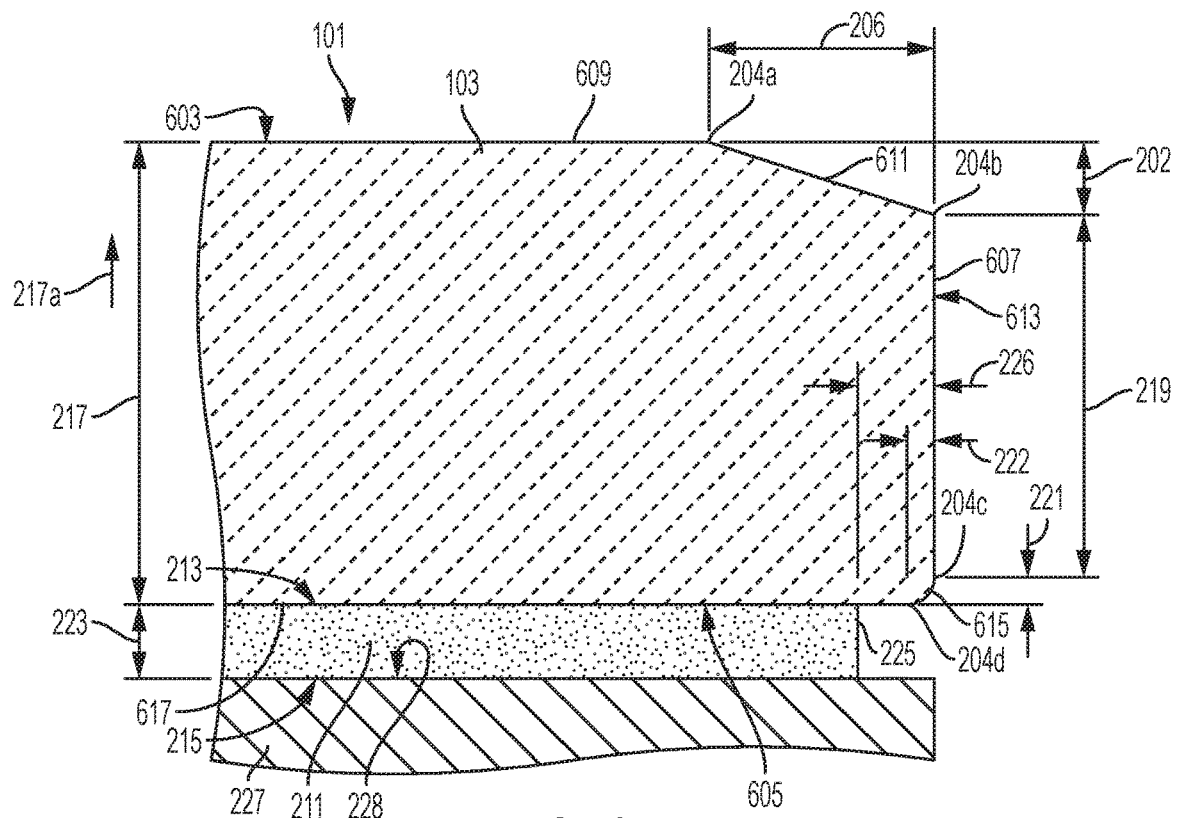
FIG. 6 is an enlarged view of some embodiments of the apparatus taken at view 3 of FIG. 2.

In some embodiments, the first major surface 105, 403, 503, 603 can further comprise a first and a peripheral portion 203, 411, 511, 611 that extends outward from the first planar portion 201, 409, 509, 609 of the first major surface 105, 403, 503, 603. The peripheral portion 203, 411, 511, 611 of the first major surface 105, 403, 503, 603 can extend towards the second major surface 207, 405, 505, 605. In some embodiments, as shown in FIGS. 3 and 5-6, the peripheral portion 203, 511, 611 of the corresponding first major surface 105, 503, 603 can comprise a flat surface. In other embodiments, as shown in FIG. 4, the peripheral portion 411 of the first major surface 403 can comprise a curved surface.

Throughout the disclosure, a height 202 of the peripheral portion 203, 411, 511, 611 of the first major surface 105, 403, 503, 603 of the glass-based substrate 103 can be defined as the distance, in the thickness direction 217a, between a first point 204a at the intersection of the peripheral portion 203, 411, 511, 611 and the first planar portion 201, 409, 509, 609 of the first major surface 105, 403, 503, 603 of the glass-based substrate 103 and a second point 204b at the intersection of the first major surface 105, 403, 503, 603 and an outer peripheral edge 107, 407, 507, 607 of the glass-based substrate 103, where the first point 204a and the second point 204b are chosen such that they are as far apart as possible in the thickness direction 217a. In some embodiments, the height 202 of the peripheral portion 203, 411, 511, 611 can be about 1 µm or more, about 5 µm or more, about 10 µm or more, about 20 µm or more, about 50 µm or more, about 400 µm or less, about 300 µm or less, about 200 µm or less, about 150 µm or less, or about 100 µm or less. In some embodiments, the height 202 of the peripheral portion 203, 411, 511, 611 can be within a range from about 1 µm to about 400 µm, from about 5 µm to about 400 µm, from about 10 µm to about 400 µm, from about 20 µm to about 400 µm, from about 50 µm to about 400 µm, from about 1 µm to about 300 µm, from about 5 µm to about 300 µm, from about 10 µm to about 300 µm, from about 20 µm to about 300 µm, from about 30 µm to about 300 µm, from about 1 µm to about 200 µm, from about 5 µm to about 200 µm, from about 10 µm to about 200 µm, from about 20 µm to about 200 µm, from about 50 µm to about 200 µm, from about 1 µm to about 150 µm, from about 5 µm to about 150 µm, from about 10 µm to about 150 µm, from about 20 µm to about 150 µm, from about 50 µm to about 150 µm, from about 1 µm to about 100 µm, from about 5 µm to about 100 µm, from about 10 µm to about 100 µm, from about 20 µm to about 100 µm, from about 50 µm to about 100 µm, and all ranges and subranges therebetween.

Throughout the disclosure, a width 206 of the peripheral portion 203, 411, 511, 611 of the first major surface 105, 403, 503, 603 of the glass-based substrate 103 can be defined as the distance, in a width direction perpendicular to the thickness direction 217a, between the first point 204a at the intersection of the peripheral portion 203, 411, 511, 611 and the first planar portion 201, 409, 509, 609 of the first major surface 105, 403, 503, 603 of the glass-based substrate 103 and the second point 204b at the intersection of the first major surface 105, 403, 503, 603 and an outer peripheral edge 107, 407, 507, 607 of the glass-based substrate 103, where the first point 204a and the second 204b are chosen such that they are as close together as possible in the width direction. In some embodiments, the width 206 of the peripheral portion 203, 411, 511, 611 can be about the same as the height 202 of the peripheral portion 203, 411, 511, 611 although the width 206 may be greater than or less than the height 202 in some embodiments. In some embodiments, the width 206 of the peripheral portion 203, 411, 511, 611 can be about 10 µm or more, about 50 µm or more, about 100 µm or more, about 200 µm or more, about 300 µm or more, about 5 mm or less, about 2 mm or less, about 1 mm or less, about 800 µm or less, or about 600 µm or less. In some embodiments, the width 206 of the peripheral portion 203, 411, 511, 611 can be within a range from about 10 µm to about 5 mm, from about 50 µm to about 5 mm, from about 100 µm to about 5 mm, from about 200 µm to about 5 mm, from about 300 µm to about 5 mm, from about 10 µm to about 2 mm, from about 50 µm to about 2 mm, from about 100 µm to about 2 mm, from about 200 µm to about 2 mm, from about 300 µm to about 2 mm, from about 10 µm to about 1 mm, from about 50 µm to about 1 mm, from about 100 µm to about 1 mm, from about 200 µm to about 1 mm, from about 300 µm to about 1 mm, from about 10 µm to about 800 µm, from about 50 µm to about 800 µm, from about 100 µm to about 800 µm, from about 200 µm to about 800 µm, from about 300 µm to about 800 µm, from about 10 µm to about 600 µm, from about 50 µm to about 600 µm, from about 100 µm to about 600 µm, from about 200 µm to about 600 µm, from about 300 µm to about 600 µm, and all ranges and subranges therebetween.

The glass-based substrate 103 can further comprise the outer peripheral edge 107, 407, 507, 607 between the first major surface 105, 403, 503, 603 and the second major surface 207, 405, 505, 605. In some embodiments, the outer peripheral edge 107, 407, 507, 607 may meet the peripheral portion 203, 411, 511, 611 of the first major surface 105, 403, 503, 603. The outer peripheral edge 107, 407, 507, 607 may comprise an outer peripheral surface 205, 413, 513, 613 that extends from the first major surface 105, 403, 503, 603 toward the second major surface 207, 405, 505, 605. In some embodiments, as shown in FIGS. 3-4 and 6, the outer peripheral surface 205, 413, 613 of the corresponding outer peripheral edge 107, 407, 607 can comprise a flat surface. In other embodiments, as shown in FIG. 5, the outer peripheral surface 513 of the outer peripheral edge 507 can comprise a curved surface. It is to be understood that either a flat or a curved outer peripheral surface of an edge can be used in combination with either a flat or a curved peripheral portion of the first major surface, as discussed above. Furthermore, as shown in FIG. 5, the outer curved peripheral surface 513 of the outer peripheral edge 507 can be provided in combination with the flat peripheral portion 511 of the first major surface 503. In further embodiments, the outer curved peripheral surface 513 of the outer peripheral edge 507 of FIG. 5 can be provided in combination with the curved peripheral portion 411 of the first major surface 403 shown in FIG. 4.

Throughout the disclosure, the outer peripheral surface 205, 413, 513, 613 of the outer peripheral edge 107, 407, 507, 607 can comprise an outermost peripheral extent. Referring to FIG. 5, the outermost peripheral extent 514 that can comprise a point or line on a surface profile of the outer peripheral surface 513 of the outer peripheral edge 507. In some embodiments, the outermost peripheral extent 514 of an outer peripheral surface 513 of an outer peripheral edge 507 may comprise a line perpendicular to the thickness direction 217a. In other further embodiments, the outermost peripheral extent 514 may comprise a line along the outer peripheral surface 513 of an outer peripheral edge 507 that is not perpendicular to the thickness direction 217a. In some embodiments, the outermost peripheral extent 514 may comprise a point on the outer peripheral surface 513. In other embodiments, as shown in FIGS. 2-4 and 6, the outermost peripheral extent may comprise the entire outer peripheral surface 205, 413, 613 of the corresponding outer peripheral edge 107, 407, 607. In still other embodiments, the outermost peripheral extent may comprise a portion less than the entire outer peripheral surface of the edge.

Throughout the disclosure, as shown in FIGS. 3-6, a height 219 of the outer peripheral surface 205, 413, 513, 613 of the outer peripheral edge 107, 407, 507, 607 of the glass-based substrate 103 can be defined as the distance between the second point 204b, as defined above, and a third point 204c on the outer peripheral surface 205, 413, 513, 613 of the outer peripheral edge 107, 407, 507, 607 of the glass-based substrate 103 in the thickness direction 217a, where the second point 204b and the third point 204c are chosen such that they are as far apart as possible in the thickness direction 217a. In some embodiments, the height 219 of the outer peripheral surface 205 of the outer peripheral edge 107 of the glass-based substrate 103 can be about 60% or more, about 65% or more, about 70% or more, about 75% or more, or about 80% or more of the thickness 217 of the glass-based substrate 103. In some embodiments, the height 219 of the outer peripheral surface 205, 413, 513, 613 of the outer peripheral edge 107, 407, 507, 607 of the glass-based substrate 103 can be about 100% or less, about 99% or less, about 98% or less, about 95% or less, about 90% or less, about 85% or less, or about 80% or less of the thickness 217 of the glass-based substrate 103. In some embodiments, the height 219 of the outer peripheral surface 205, 413, 513, 613 of the outer peripheral edge 107, 407, 507, 607 of the glass-based substrate 103 can be in range from about 60% to about 99%, from about 65% to about 99%, from about 70% to about 99%, from about 75% to about 99%, from about 80% to about 99%, from about 60% to about 98%, from about 65% to about 98%, from about 70% to about 98%, from about 75% to about 98%, from about 80% to about 99%, from about 60% to about 95%, form about 65% to about 95%, from about 70% to about 95%, from about 75% to about 95%, from about 80% to about 95%, from about 60% to about 90%, from about 65% to about 90%, from about 70% to about 90%, from about 75% to about 90%, from about 80% to about 90%, from about 60% to about 85%, from about 65% to about 85%, from about 70% to about 85%, from about 75% to about 85%, from about 60% to about 80%, from about 65% to about 80%, from about 70% to about 80%, and all ranges and subranges therebetween of the thickness 217 of the glass-based substrate 103.

In some embodiments, the outer peripheral edge 107, 407, 507, 607 can further comprise an undercut 208, 415, 515, 615. The undercut 208, 415, 515, 615 can extend between the outer peripheral surface 205, 413, 513, 613 of the outer peripheral edge 107, 407, 507, 607 and the second major surface 207, 405, 505, 605. In some embodiments, as shown in FIGS. 3-5, the undercut 208, 415, 515 of the corresponding outer peripheral edge 107, 407, 507 may comprise a flat surface. In some embodiments, as shown in FIG. 6, the undercut 615 of the outer peripheral edge 607 can comprise a curved surface. It is to be understood that either a flat or a curved undercut of an edge can be combined with either a flat or a curved outer peripheral surface of an edge and either a flat or a curved peripheral portion of the first major surface, as discussed above.

Throughout the disclosure, a height 221 of the undercut 208, 415, 515, 615 of the outer peripheral edge 107, 407, 507, 607 of a glass-based substrate 103 can be defined as the distance, in the thickness direction 217a, between the third point 204c, as defined above, and a fourth point 204d at an intersection of the undercut 208, 415, 515, 615 of the outer peripheral edge 107, 407, 507, 607 and the second major surface 207, 405, 505, 605 of the glass-based substrate 103, where the third point 204c and the fourth point 204d are chosen such that they are as close together as possible in the thickness direction 217a.

Throughout the disclosure, a width 222 of the undercut 208, 415, 515, 615 of the outer peripheral edge 107, 407, 507, 607 of a glass-based substrate 103 can be defined as the distance, in a width direction perpendicular to the thickness direction 217a, between the third point 204c, as defined above, and the fourth point 204d, as defined above, where the third point 204c and the fourth point 204d are as close together as possible in the width direction. In some embodiments, the width 222 of the undercut 208 may be about the same as the height 221 of the undercut 208 although the width 222 of the undercut 208 may be greater than or less than the height 221 of the undercut 208 in further embodiments.

In some embodiments, the height 221 and/or width 222 of the undercut 208, 415, 515, 615 can be about 50 micrometers (μm) or less, about 40 μm or less, about 30 μm or less, about 20 μm or less, about 10 μm or less, about 100 nanometers (nm) or more, about 200 nm or more, about 500 nm or more, or about 1 μm or more. In some embodiments, the height 221 and/or width 222 of the undercut 208, 415, 515, 615 can be within a range from about 100 nm to about 50 μm, from about 200 nm to about 50 μm, from about 500 nm to about 50 μm, from about 1 μm to about 50 μm, from about 100 nm to about 40 μm, from about 200 nm to about 40 μm, from about 500 nm to about 40 μm, from about 1 μm to about 40 μm, from about 100 nm to about 30 μm, from about 200 nm to about 30 μm, from about 500 nm to about 30 μm, from about 1 μm to about 30 μm, from about 100 nm to about 20 μm, from about 200 nm to about 20 μm, from about 500 nm to about 20 μm, from about 1 μm to about 20 μm, from about 100 nm to about 10 μm, from about 200 nm to about 10 μm, from about 500 nm to about 10 μm, from about 1 μm to about 50 μm, and all ranges and subranges therebetween.

In some embodiments, the undercut 208, 415, 515, 615 may be polished using mechanical grinding, mechanical polishing, or an acid treatment. Unless otherwise indicated, all surface roughness values set forth in the disclosure are an average surface roughness (Ra) calculated using arithmetical mean of the absolute deviations of a surface profile from an average position in a direction normal to the surface of a test area of 10 μm by 10 μm as measured using atomic force microscopy (AFM) unless a dimension of the undercut was about 10 μm or less in which case the test area was rectangular but still comprised an area of about 100 μm$^2$. The surface of the undercut 208, 415, 515, 615 may comprise an average surface roughness (Ra) of about 50 nm or less, about 40 nm or less, about 30 nm or less, about 20 nm or less, or about 10 nm or less. In some embodiments, the average surface roughness (Ra) of the surface of the undercut 208, 415, 515, 615 may be within a range from about 1 nm to about 50 nm, from about 2 nm to about 50 nm, from about 5 nm to about 50 nm, from about 10 nm to about 50 nm, from about 1 nm to about 40 nm, from about 2 nm to about 40 nm, from about 5 nm to about 40 nm, from about 10 nm to about 40 nm, from about 1 nm to about 30 nm, from about 2 nm to about 30 nm, from about 5 nm to about 30 nm, from about 10 nm to about 30 nm, from about 1 nm to about 20 nm, from about 2 nm to about 20 nm, from about 5 nm to about 20 nm, from about 10 nm to about 20 nm, from about 1 nm to about 10 nm, from about 2 nm to about 10 nm, from about 5 nm to about 10 nm, and all ranges and subranges therebetween.

In some embodiments, the glass-based substrate 103 may be strengthened, creating a strengthened glass-based substrate. Methods of creating a strengthened glass-based substrate comprise chemical strengthening, thermal strengthening, or a combination of chemical strengthening and thermal strengthening. A strengthened glass-based substrate (e.g., glass-based substrate 103) can be characterized by a central tension (CT), which may be defined as the maximum tensile stress inside the strengthened glass-based substrate as measured using a scattered light polarizing scope (SCALP) technique known in the art. In some embodiments, a strengthened glass-based substrate (e.g., glass-based substrate 103) may comprise a CT of about 10 MegaPascals (MPa) or more, about 20 MPa or more, about 30 MPa or more, about 50 MPa or more, about 100 MPa or less, about 80 MPa or less, or about 60 MPa or less. In some embodiments, a strengthened glass-based substrate (e.g., glass-based substrate 103) may comprise a central tension within a range from about 10 MPa to about 100 MPa, from about 20 MPa to about 100 MPa, from about 30 MPa to about 100 MPa, from about 50 MPa to about 100 MPa, from about 10 MPa to about 80 MPa, from about 20 MPa to about 80 MPa, from about 30 MPa to about 80 MPa, from about 50 MPa to about 80 MPa, from about 10 MPa to about 60 MPa, from about 20 MPa to about 60 MPa, from about 30 MPa to about 60 MPa, from about 50 MPa to about 60 MPa, and all ranges and subranges therebetween. In other embodiments, the glass-based substrate 103 may not be strengthened.

Thermal strengthening comprises controlling a temperature of the glass-based substrate 103 to be a predetermined initial temperature, To, and then quenching the glass-based substrate at a predetermined heat transfer rate, h. To obtain higher heat transfer rates and to minimize the occurrence of breakage, some embodiments transferred thermal energy from the glass-based substrate 103 across a gap that may be free of solid or liquid matter to a heat sink and a gas that can be circulated through the gap while the glass-based substrate 103 may be supported by air bars. In some embodiments, thermal strengthening comprised an initial temperature, To, between about 700° C. and about 900° or about 800° C. and a heat transfer rate, h, of about 0.010 cal/cm$^2$-s-° C. or more, of about 0.100 cal/cm$^2$-s-° C. or less, or within a range from about 0.010 cal/cm$^2$-s-° C. to about 0.100 cal/cm$^2$-s-° C. In some exemplary embodiments, a screen protector 101 comprising glass-based substrate 103 can be thermally strengthened using an initial temperature, To, about equal to a glass transition temperature of the glass-based substrate 103 or more.

Chemical strengthening comprises a glass-based substrate 103 that may already be thermally strengthened that may be either sprayed with molten salt or ionic salt solution and/or immersed in a molten salt bath or an ionic salt solution to exchange ions in the glass-based substrate 103 with those in the molten salt bath or ionic salt solution. This process can be referred to as "ion exchange" because ions at or near the surface of the glass-based substrate 103 are replaced by (i.e., exchanged with) ions with same oxidation state but with larger ionic radii from the molten salt bath or ionic salt solution. In some embodiments, the ions exchanged out of the glass-based substrate 103 can comprise monovalent alkali metal cations, for example $Li^+$, $Na^+$, $K^+$, $Rb^+$, and $Cs^+$. In some embodiments, the ions exchanged into the glass-based substrate 103 can comprise alkali metal cations or other metal cations, for example $Ag^+$. In some embodiments, the molten salt bath or ionic salt solution may comprise any one or more of $KNO_3$, $NaNO_3$, and $LiNO_3$. The molten salt bath or ionic salt solution may comprise a temperature about 300° C. or more, about 350° or more, about 500° or less, or about 450° C. or less. The molten salt bath or ionic salt solution may comprise a temperature of about 300° C. to about 500° C., from about 350° C. to about 500° C., from about 350° C. to about 5000° C., from about 350° C. to about 450° C. In some embodiments, the glass-based substrate 103 can be immersed for about 10 minutes or more, about 30 minutes or more, about 5 hours or less, or about 1 hour or less. In some embodiments, the glass-based substrate can be immersed for a time within a range from about 10 minutes to about 5 hours, from about 10 minutes to about 1 hour, from about 30 minutes to about 5 hours, from about 30 minutes to about 1 hour, and all ranges and subranges therebetween.

The screen protector 101 may also comprise an adhesive 211. The adhesive may comprise one or materials comprising synthetic polymers and natural materials. Embodiments of natural materials can comprise animal glue, casein glue, blood albumen glue, starch, dextrin agar, and mastic. Embodiments of suitable polymers comprise, without limitation, copolymers such a di-block copolymers, co-block copolymers, etc. and blends thereof: thermoplastics comprising polystyrene (PS), polycarbonate (PC), polyesters comprising polyethyleneterephthalate (PET), polyolefins comprising polyethylene (PE), polyvinylchloride (PVC), acrylic polymers comprising polymethyl methacrylate (PMMA), thermoplastic urethanes (TPU), polyetherimide (PEI), epoxies, and silicones comprising polydimethylsiloxane (PDMS). In exemplary embodiments, the adhesive 211 will reduce the overall transparency of the screen protector 101 by about 5% or less, or about 2% or less, or about 1% or less. In some further exemplary embodiments, the adhesive 211 may comprise a first material in contact with the glass-based substrate 103 and a second material in contact with a device 227. The first material may comprise a high peel strength, for example about 2 N/mm or more, about 5 N/mm or more, within a range from about 2 N/mm to about 10 N/mm, or within a range from about 5 N/mm to about 10 N/mm. The second material may comprise a low peel strength, for example about 0.5 N/mm or less, about 0.2 N/mm or less, about 0.1 N/mm or less, within a range from about 0.5 N/mm to about 0.001 N/mm, or within a range from about 0.2 N/mm to about 0.001 N/mm. Unless otherwise indicated, all peel strength measurements were performed in accordance with the American Society for Testing and Materials (ASTM) Standard D3330. In some embodiments, the screen protector 101 can be removed from the device 227 when desired without adhesive 211 debonding and thereafter remaining on the device.

The adhesive 211 may comprise a first major surface 213 that can be adhered to the second major surface 207, 405, 505, 605 of the glass-based substrate 103. The adhesive 211 may also comprise a second major surface 215 that can be opposite the first major surface 213 of the adhesive 211. Throughout the disclosure, as shown in FIGS. 3-6, a thickness 223 of the adhesive 211 can be defined as a distance between a first point on the first major surface 213 of the adhesive 211 and a second point on the second major surface 215 of the adhesive 211 in the thickness direction 217a, where the first point and the second point are chosen such that they are as far apart as possible in the thickness direction 217a. In some embodiments, the thickness 223 of the adhesive 211 can be about 50 µm or more, about 80 µm or more, about 100 µm or more, about 120 µm or more, about 200 µm or less, about 190 µm or less, about 180 µm or less, or about 170 µm or less. In some embodiments, the thickness 223 of the adhesive 211 can be within a range from about 50 µm to about 200 µm, from about 80 µm to about 200 µm, from about 100 µm to about 200 µm, from about 120 µm to about 200 µm, from about 50 µm to about 190 µm, from about 80 µm to about 190 µm, from about 100 µm to about 190 µm, from about 120 µm to about 190 µm, from about 50 µm to about 180 µm, from about 80 µm to about 180 µm, from about 100 µm to about 180 µm, from about 120 µm to about 180 µm, from about 50 µm to about 170 µm, from about 80 µm to about 170 µm, from about 100 µm to about 170 µm, from about 120 µm to about 170 µm, and all ranges and subranges therebetween.

The adhesive 211 may comprise an edge 225. The edge 225 can extend from the first major surface 213 to the second major surface 215 of the adhesive 211. Throughout the disclose, an offset 226 of the adhesive 211 from the outer peripheral edge 107, 407, 507, 607 of the glass-based substrate 103 can be defined as a distance, in a direction perpendicular to the thickness direction 217a, that an outermost peripheral extent of a surface of the edge 225 of the adhesive 211 is recessed from the outermost peripheral extent (e.g., 514) of the outer peripheral edge 107, 407, 507, 607 of the glass-based substrate 103. In some embodiments, the offset 226 of the adhesive 211 from the outer peripheral edge 107, 407, 507, 607 of the glass-based substrate 103 can be about 100 nm or more, about 200 nm or more, about 500 nm or more, about 1 µm or more, about 5 µm or more, about 100 µm or less, about 75 µm or less, about 50 µm or less, about 40 µm or less, or about 30 µm or less. In some embodiments, the offset 226 can be within a range from about 100 nm to about 100 µm, from about 200 nm to about 100 µm, from about 500 nm to about 100 µm, from about 1 µm to about 100 µm, from about 5 µm to about 100 µm, from about 100 nm to about 75 µm, from about 200 nm to about 75 µm, from about 500 nm to about 75 µm, from about 1 µm to about 75 µm, from about 2 µm to about 75 µm, from about 5 µm to about 75 µm, from about 100 nm to about 50 µm, from about 200 nm to about 50 µm, from about 500 nm to about 50 µm, from about 1 µm to about 50 µm, from about 2 µm to about 50 µm, from about 5 µm to about 50 µm, from about 100 nm to about 40 µm, from about 200 nm to about 40 µm, from about 500 nm to about 40 µm, from about 1 µm to about 40 µm, from about 2 µm to about 40 µm, from about 5 µm to about 40 µm, from about 100 nm to about 30 µm, from about 200 nm to about 30 µm, from about 500 µm to about 30 µm, from about 1 µm to about 30 µm, from about 2 µm to about 30 µm, from about 5 µm to about 30 µm, and all ranges and subranges therebetween.

The second major surface 215 of the adhesive 211 may be adhered to the device 227. In some embodiments, the device 227 may comprise a display, which can comprise a liquid crystal display (LCD), an electrophoretic display (EPD), an organic light emitting diode display (OLED), a plasma display panel (PDP), or touch sensor embedded display. In some embodiments, the device 227 may be a portable electronic device (e.g., smartphone, tablet, watch, laptop) or a stationary electronic device (e.g., computer monitor, television set). In some embodiments, there can be a transparent layer on the device 227 in direct contact with the second major surface 215 of the adhesive 211. In some embodiments, the transparent layer of the device 227 can be a screen (e.g., a cover substrate) and can be a material typically used as a screen including, but not limited to, an amorphous inorganic material (e.g., glass), a crystalline material (e.g., sapphire, single crystal or polycrystalline alumina, spinel ($MgAl_2O_4$)), or a polymer. Embodiments of suitable polymers comprise, without limitation, copolymers and blends thereof: thermoplastics comprising polystyrene (PS), polycarbonate (PC), polyesters comprising polyethyleneterephthalate (PET), polyolefins comprising polyethylene (PE), polyvinylchloride (PVC), acrylic polymers comprising polymethyl methacrylate (PMMA), thermoplastic urethanes (TPU), polyetherimide (PEI), epoxies, and silicones comprising polydimethylsiloxane (PDMS). Embodiments of glass, which may be strengthened or non-strengthened and may be free of lithia or not, comprise soda lime glass, alkali aluminosilicate glass, alkali containing borosilicate glass and alkali aluminoborosilicate glass.

In a four-point bending test, in accordance with the American Society for Testing and Materials (ASTM) Standard 158-02, a screen protector 101 (i.e., a glass-based substrate 103 and an adhesive 211) was subjected to a bending load of about 5 mm/minute, using an 18 mm load span and a 36 mm support span, with tape on the side of compression, and a polytetrafluoroethylene (PTFE) surface in contact with the side of the screen protector 101 in tension. Testing continued until the screen protector 101 failed. Only screen protectors that failed within about 10 mm of the edge were considered in calculating an edge strength. The calculated edge strength can be reported as a strength where the probability of failure is 10% for a four-point bend test (B10 edge strength). In some embodiments, a screen protector 101 according to the present disclosure may comprise a B10 edge strength of about 250 MegaPascals (MPa) or more, about 300 MPa or more, about 400 MPa or more, about 500 MPa or more, about 600 MPa or more, about 700 MPa or more, about 800 MPa or more, or about 1,000 MPa or less. In some embodiments, a screen protector 101 according to the present disclosure may comprise a B10 edge strength within a range of from about 250 MPa to about 1,000 MPa, from about 300 MPa to about 1,000 MPa, from about 400 MPa to about 1,000 MPa, from about 500 MPa to about 1,000 MPa, from about 600 MPa to about 1,000 MPa, from about 700 MPa to about 1,000 MPa, from about 800 MPa to about 1,000 MPa, and all ranges and subranges therebetween.

Figure 7:
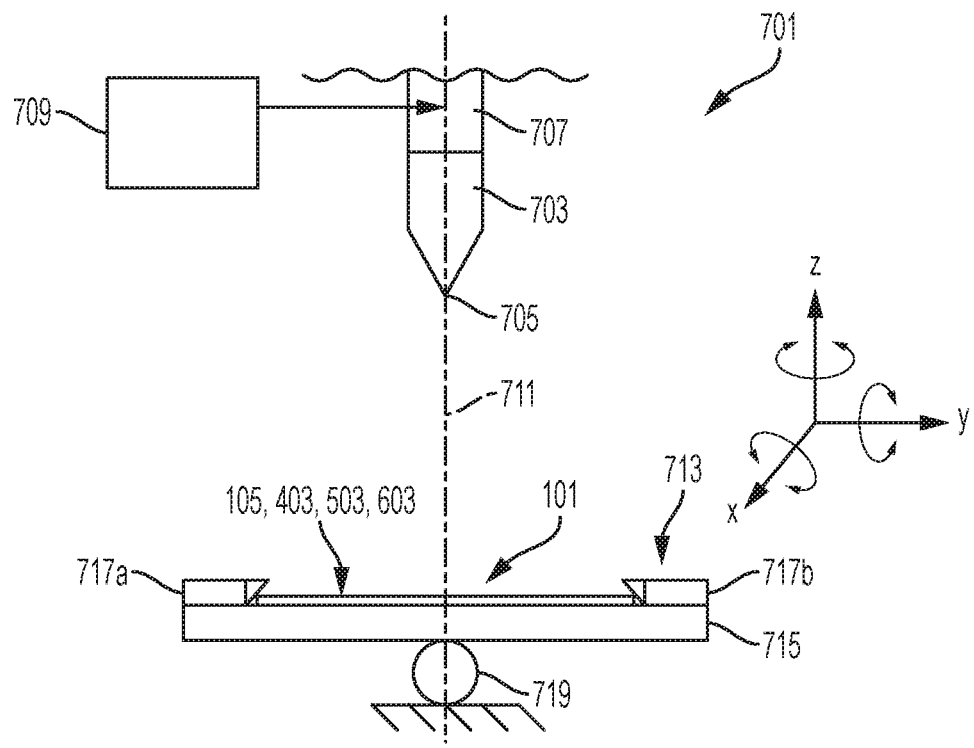
FIG. 7 is a schematic side view of a testing apparatus that can be used to determine a crush strength of an edge of a screen protector in accordance with the embodiments of the disclosure.
Figure 8:
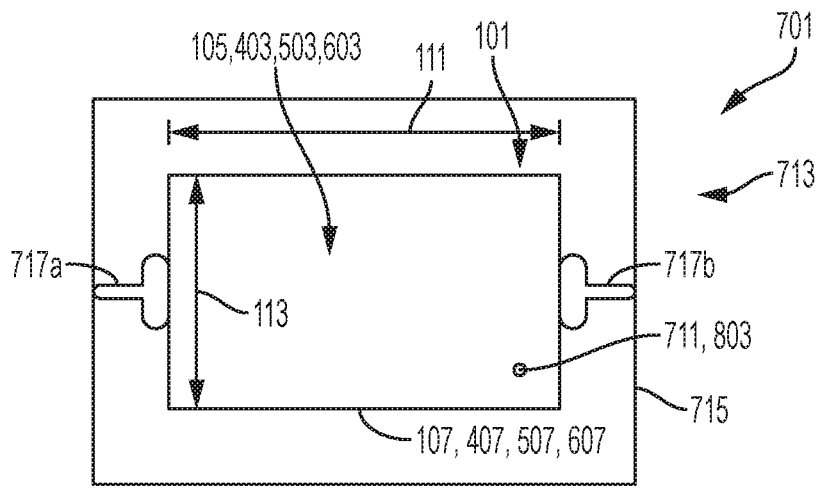
FIG. 8 is a schematic top view of the testing apparatus of FIG. 7 that can be used to determine a crush strength of an edge of a screen protector in accordance with embodiments of the disclosure.

In a crush strength test, a screen protector 101 is tested using the test apparatus 701 shown in FIGS. 7 and 8. The screen protector 101 is always mounted on a mounting surface 228 of a device 227 (e.g., the device 227 that it is designed to protect) with the adhesive 211, wherein the mounting surface 228 of the device 227 comprises substantially the same contour as the second major surface 207 of the glass-based sheet 103. An apparatus comprising screen protector 101 mounted on the device 227 is secured in a carrier 713. As shown, the carrier 713 can comprise a plate 715 supporting a weight of the screen protector 101 as well as clamps 717a, 717b that prevent the screen protector 101 from moving on the carrier 713 during testing. The carrier 713 is movably mounted on a pivot joint 719, which is used to adjust an angle between a plane defined by the carrier 713 and a probe axis 711. The pivot joint 719 allows pivoting of the carrier 713 along the x-y-z directional components as shown by pivot arrows in FIG. 7 and can be locked to prevent further adjustment when desired. The probe axis 711 impinges the first major surface 105 of the screen protector 101 at a test location 803 that is 3 mm from the outermost peripheral extent (e.g., 514) of the outer peripheral surface 205, 413, 513, 613 of the outer peripheral edge 107, 407, 507, 607 of the glass-based substrate 103 in a direction of the length 111 or a direction of the width 113 of the screen protector 101. The probe 703 comprises an outer tip 705 that is on the probe axis 711 at a location that is closest to the carrier 713 in the direction of the probe axis 711. The outer tip 705 is formed by two converging planar surfaces of the probe 703 that taper at an inclined angle in a direction toward the outer tip 705 to define a contact area of the outer tip 705 extending along a width of the outer tip 705. The inclined angle of the probe 703 is 30.17° and the inclined angle is bisected by the probe axis 711. The probe 703 comprises an end portion extending 0.25 mm from the outer tip 705 of the probe 703 with a surface area of 1.4 $mm^2$. The probe 703 is attached to a force sensor 707 that is connected to a display 709 indicating the load currently applied by the probe 703 on the screen protector 101. The probe 703 is oriented so that a direction of the width of the outer tip 705 is substantially perpendicular to the edge being tested.

The first step of the testing method is to secure the apparatus comprising the screen protector 101 mounted to the mounting surface 228 of the device 227 with the adhesive 211 in the carrier 713. Also, the carrier 713 is adjusted so that the probe axis 711 impinges on the glass-based substrate 103 of the screen protector 101 at the test location 803 at an angle of incidence that is normal to the first major surface 105, 403, 503, 603 of the screen protector 101 at the test location 803. The second step is to move the probe 703 along the probe axis 711 until the outer tip 705 of the probe 703 touches the glass-based substrate 103 of the screen protector 101 and a predetermined testing load is applied to the screen protector 101, as indicated by the display 709. The third step is to determine if the screen protector 101 has failed by cracking at the test location 803, which can be determined using visual inspection to look for macroscopic cracks, listening for a sound of a crack, or monitoring the display 709 for a signal indicative of cracking. If the screen protector 101 has cracked, then only the last step remains. Otherwise, the fourth step is to determine if the current value of the predetermined testing load is equal to the predetermined maximum load. If the current value of the predetermined testing load is equal to the predetermined maximum load, then only the last step remains. Otherwise, the predetermined testing load is increased at a predetermined rate and the method returns to the second step. When the last step of the testing method is reached, the screen protector 101 has either failed by cracking at the test location 803 or a predetermined maximum load has been reached. Then, in the last step, the load at failure can be calculated based on the value displayed 709 at the end of the test. If the screen protector 101 failed, then the load at failure can be a single value. Otherwise, the testing method has determined a lower bound for the load at failure (e.g., 50 Newtons (N) or more, at least 50 N). The crush strength of the outer peripheral edge 107, 407, 507, 607 of the screen protector 101 (as part of the apparatus comprising the screen protector 101 mounted on the mounting surface 228 of the device 227 with the adhesive 211) can also be calculated using the area of the probe 703 in contact with the screen protector 101 at the end of the test. Unless otherwise indicated, the predetermined rate was 10 N/min and the predetermined maximum load was about 200 Newtons (N) or more. The reported average edge crush strength values are based on the load at failure for an average of 10 crush strength measurements. In some embodiments, the screen protector 101 can comprise an average crush strength of about 50 Newtons (N) or more, about 100 N or more, about 150 N or more, or about 200 N or more, about 500 N or less, about 400 N or less, or about 300 N or less. In some embodiments, the screen protector 101 can comprise an average crush strength within a range from about 50 N to about 500 N, from about 100 N to about 500 N, from about 150 N to about 200 N, from about 250 N to about 500 N, from about 50 N to about 400 N, from about 100 N to about 400 N, from about 150 N to about 400 N, from about 200 N to about 400 N, from about 50 N to about 300 N, from about 100 N to about 300 N, from about 150 N to about 300 N, from about 200 N to about 300 N, and all ranges and subranges therebetween.

Additional details of the crush strength test and apparatus can be found in concurrently filed patent application titled "Methods and Apparatus for Determining a Crush Strength of an Edge", having application Ser. No. 62/718,547, which is hereby incorporated by reference in its entirety.

EXAMPLES

Various embodiments will be further clarified by the following three examples.

Example A comprised non-strengthened glass-based substrate with a length of about 143 mm, a width of about 70 mm, and a thickness of about 330 µm. The peripheral portion of the first major surface of the glass-based substrate comprised a flat surface with a width of about 300 µm and a height of about 50 µm. The edge comprised an outer peripheral portion with a height of about 230 µm (about 70% of the thickness of the glass-based substrate) and an undercut comprising a height of about 50 µm, a width of about 50 µm, and a surface roughness (Ra) of about 50 nm. The screen protector further comprised an adhesive with a thickness of about 180 µm and an offset of about 130 µm. Example A exhibited a B10 edge strength of about 325 MPa and an average crush strength of an edge of about 65 N.

Example B comprised a non-strengthened glass-substrate with a length of about 158 mm, a width of about 78 mm, and a thickness of about 350 µm. The peripheral portion of the first major surface of the glass-based substrate comprised a curved surface with a width of about 440 µm and a height of about 70 µm. The edge comprised an outer peripheral portion with a height of about 230 µm (about 65% of the thickness of the glass-based substrate) and an undercut comprising a height of about 50 µm, a width of about 50 µm, and a surface roughness (Ra) of about 50 nm. The screen protector further comprised an adhesive with a thickness of about 120 µm and an offset of about 80 µm. Example B exhibited a B10 edge strength of about 375 MPa and an average crush strength of an edge of about 80 N.

Example C is identical to Example B except that example C comprised a strengthened glass-based substrate with a CT of about 48 MPa. Example C exhibited a B10 edge strength of about 475 MPa and an average crush strength of an edge of about 110 N.

Based on these exemplary examples, it should be clear that strengthening the glass-based substrate can substantially increase both the edge strength and the crush strength of an edge of the screen protector. For example, the edge strength was increased by about 150 MPa and the crush strength was increased by about 30 N due to the strengthening of Example C relative to Example B. Without wishing to be bound by theory, both the edge strength and the crush strength are strongly dependent on the thickness of the glass-based substrate in the bulk (i.e., thickness 117) as well as at the edge (i.e., the height 219 of the outer peripheral surface 205). For example, Example B has a crush strength and edge strength greater than Example A, and the thickness of the glass-based substrate Example B was greater than the thickness of the glass-based substrate in Example A by about 20 µm. As such, it can be desirable to maximize the height of the outer peripheral portion of the edge of the glass-based substrate for a predetermined thickness of the glass-based substrate. Likewise, both the edge strength and the crush strength may be increased relative to Example A or Example B by polishing the undercut to comprise a surface roughness (Ra) of less than 50 nm. Without wishing to be bound by theory, polishing the undercut can remove surface flaws in the glass that can contribute to failure, as described by the Griffith's equation, and obtaining a smoother undercut surface can reduce stress concentrators in that region. Since the adhesive is in contact with a PTFE substrate for the four-point bend test, the edge strength of a screen protector may be substantially insensitive to the thickness of the adhesive and the offset. On the other hand, the crush strength can be more sensitive to the adhesive thickness. Without wishing to be bound by the theory, a lower adhesive thickness may limit the deformation of the glass-based substrate because there is less adhesive to undergo plastic deformation or to be displaced during a test for crush strength. For example, both the crush strength and the edge strength of Example B were greater than the respective values for Example A, and the adhesive thickness and offset were smaller for Example B than Example A. Also, there was a bigger percentage difference between the crush strength (about 23%) than the edge strength (about 13%) between the samples, which is consistent with the crush strength being more sensitive to adhesive properties than the edge strength.

In some embodiments, the crush strength may be higher than Example A or Example B/C when the adhesive thickness is less than the corresponding adhesive thickness of the corresponding example. Similarly, the crush strength may be increased relative to Example A or Example B when the offset is decreased. Without wishing to be bound by theory, decreasing the offset may decrease the portion of the glass-based substrate cantilevered, which may contribute to failure during crush testing.

Directional terms as used herein—for example up, down, right, left, front, back, top, bottom—are made only with reference to the figures as drawn and are not intended to imply absolute orientation.

As used herein, the terms "comprising" and "including", and variations thereof, shall be construed as synonymous and open-ended, unless otherwise indicated.

As used herein the terms "the," "a," or "an," mean "at least one," and should not be limited to "only one" unless explicitly indicated to the contrary. Thus, for example, reference to "a component" comprises embodiments comprising two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to comprise the specific value or end-point referred to. Whether or not a numerical value or end-point of a range in the specification recites "about," the numerical value or end-point of a range is intended to comprise two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A screen protector comprising:
   a glass-based substrate comprising:
      a first major surface comprising a first planar portion and a peripheral portion extending outwardly from the first planar portion;
      a second major surface comprising a second planar portion opposite the first planar portion, wherein the second planar portion is parallel relative to the first planar portion;
      a thickness defined between the first planar portion and the second planar portion along a thickness direction perpendicular to the first planar portion is within a range of from about 100 micrometers to about 1,000 micrometers; and
      an edge extending between the first major surface and the second major surface, the edge comprising an outer peripheral surface intersecting the peripheral portion of the first major surface, the edge further comprising an undercut surface intersecting the outer peripheral surface of the edge and the second planar portion of the second major surface; and
   an adhesive comprising:
      a first major surface adhered to the second planar portion of the second major surface of the glass-based substrate;
      a second major surface opposite the first major surface of the adhesive;
      a thickness defined between the first major surface of the adhesive and the second major surface of the adhesive; and
      an edge extending between the first major surface of the adhesive and the second major surface of the adhesive,
   wherein the screen protector comprises a 10% probability of failure for a four-point bend test (B10 edge strength) within a range of from about 300 MegaPascals (MPa) to about 1,000 MPa, the glass-based substrate is mounted to a mounting surface of an electronic device with the adhesive, and the apparatus comprises an average failure for an edge crush test (average crush strength) on the glass-based sheet for a load within a range of from about 50 Newtons (N) to about 500 N, the edge crush test comprises increasing a load applied by a probe in a direction of the probe axis at a location within 3 mm from an outermost peripheral extent of the outer peripheral surface of the screen protector until failure or a predetermined maximum load is reached, the probe comprising a surface area of 1.4 mm$^2$ with an inclined angle of 30.17° bisected by the probe axis and an end portion extending 0.25 mm in the direction of the probe axis.

2. The screen protector of claim 1, wherein the peripheral portion of the first major surface of the glass-based substrate extends in a direction toward a plane of the second planar portion.

3. The screen protector of claim 1, wherein the outer peripheral surface of the edge comprising a height in the thickness direction that is within a range of from about 60% to about 99% of the thickness of the glass-based substrate.

4. The screen protector of claim 1, wherein the undercut surface comprises a height in the thickness direction that is within a range of from about 100 nanometers to about 50 micrometers.

5. The screen protector of claim 1, wherein a maximum distance between the outer peripheral surface of the edge of the glass-based substrate and the edge of the adhesive in a direction perpendicular to the thickness direction of the glass-based substrate is within a range of from about 100 nanometers to about 80 micrometers.

6. The screen protector of claim 2, wherein the undercut surface of the edge of the glass-based substrate comprises a surface roughness (Ra) within a range of from about 1 nanometer to about 50 nanometers.

7. An apparatus comprising:
   a glass-based substrate comprising:
      a first major surface comprising a first planar portion and a peripheral portion extending outwardly from the first planar portion;
      a second major surface comprising a second planar portion opposite the first planar portion, wherein the second planar portion is parallel relative to the first planar portion;
      a thickness defined between the first planar portion and the second planar portion along a thickness direction perpendicular to the first planar portion is within a range of from about 100 micrometers to about 1,000 micrometers; and
      an edge extending between the first major surface and the second major surface, the edge comprising an outer peripheral surface intersecting the peripheral portion of the first major surface, the edge further comprising an undercut surface intersecting the outer peripheral surface of the edge and the second planar portion of the second major surface, the outer peripheral surface of the edge comprising a height in the thickness direction that is within a range of from about 60% to about 99% of the thickness of the glass-based substrate, the undercut surface comprising a surface roughness (Ra) within a range of from about 1 nanometer to about 50 nanometers;
   an adhesive comprising:
      a first major surface adhered to the second planar portion of the second major surface of the glass-based substrate;

a second major surface opposite the first major surface of the adhesive;

a thickness defined between the first major surface of the adhesive and the second major surface of the adhesive is within a range of from about 50 micrometers to about 200 micrometers; and an edge extending between the first major surface of the adhesive and the second major surface of the adhesive, wherein a maximum distance between the outer peripheral surface of the edge of the glass-based substrate and the edge of the adhesive in a direction perpendicular to the thickness direction of the glass-based substrate is within a range of from about 100 nanometers to about 100 micrometers; and an electronic device comprising a mounting surface, wherein the glass-based substrate is mounted to the mounting surface of the electronic device with the adhesive, and the apparatus comprises an average failure for an edge crush test (average crush strength) on the glass-based sheet for a load within a range of from about 50 Newtons (N) to about 500 N, the edge crush test comprises increasing a load applied by a probe in a direction of the probe axis at a location within 3 mm from an outermost peripheral extent of the outer peripheral surface of the screen protector until failure or a predetermined maximum load is reached, the probe comprising a surface area of 1.4 mm$^2$ with an inclined angle of 30.17° bisected by the probe axis and an end portion extending 0.25 mm in the direction of the probe axis.

8. The apparatus of claim 7, wherein the peripheral portion of the first major surface of the glass-based substrate extends in a direction toward a plane of the second planar portion.

9. The apparatus of claim 7, wherein the undercut surface comprises a height in the thickness direction that is within a range of from about 100 nanometers to about 50 micrometers.

10. The apparatus of claim 7, wherein the maximum distance between the outer peripheral surface of the edge of the glass-based substrate and the edge of the adhesive in a direction perpendicular to the thickness direction of the glass-based substrate is within a range of from about 100 nanometers to about 80 micrometers.

11. The apparatus of claim 7, wherein the maximum distance between the outer peripheral surface of the edge of the glass-based substrate and the edge of the adhesive in a direction perpendicular to the thickness direction of the glass-based substrate is within a range of from about 1 micrometer to about 50 micrometers.

12. A portable electronic device comprising the screen protector of claim 7 comprising:

a display;

screen extending over the display, the screen comprising an outer major surface; and the second major surface of the adhesive adhered to the outer major surface of the screen.

13. The screen protector of claim 1, wherein the peripheral portion of the first major surface of the glass-based substrate comprises a curved surface.

14. The screen protector of claim 1, wherein the undercut surface comprises a flat surface.

15. The screen protector of claim 1, wherein the thickness of the glass-based substrate is within a range of from about 100 micrometers to about 400 micrometers.

16. The screen protector of claim 1, wherein the adhesive comprises a thickness defined between the first major surface of the adhesive and the second major surface of the adhesive is within a range of from about 50 micrometers to about 200 micrometers.

17. The apparatus of claim 7, wherein the peripheral portion of the first major surface of the glass-based substrate comprises a curved surface.

18. The apparatus of claim 7, wherein the undercut surface comprises a flat surface.

19. The apparatus of claim 7, wherein the thickness of the glass-based substrate is within a range of from about 100 micrometers to about 400 micrometers.

20. The apparatus of claim 7, wherein the glass-based substrate may comprise a strengthened glass-based substrate selected from a group consisting of a chemically strengthened glass-based substrate, a thermally strengthened glass-based substrate, and a chemically and thermally strengthened glass-based substrate.

* * * * *